United States Patent
Matsuto et al.

[11] Patent Number: 5,416,708
[45] Date of Patent: May 16, 1995

[54] SYSTEM FOR MONITORING AND CONTROLLING MOTOR VEHICLE RUNNING CONDITION

[75] Inventors: Takushi Matsuto; Atsuo Ota; Tatsuo Hayashi, all of Wako; Akinori Akai, Osaka, all of Japan

[73] Assignees: Honda Giken Kogyo Kabushiki Kaisha, Tokyo; NEC Home Electronics, Ltd., Osaka, both of Japan

[21] Appl. No.: 127,526

[22] Filed: Sep. 28, 1993

[30] Foreign Application Priority Data

Sep. 30, 1992 [JP] Japan .................. 4-261457

[51] Int. Cl.⁶ .............................. B60T 8/32
[52] U.S. Cl. ............... 364/426.02; 364/424.03; 371/11.3; 303/103
[58] Field of Search .............. 364/424.03, 424.04, 364/426.02, 426.03, 550, 551.01; 371/11.1, 11.3, 68.3; 180/197; 303/100, 103

[56] References Cited

U.S. PATENT DOCUMENTS

| | | | |
|---|---|---|---|
| 4,644,538 | 2/1987 | Cooper et al. | 371/11.3 |
| 4,709,341 | 11/1987 | Matsuda | 364/426.02 |
| 4,773,072 | 9/1988 | Fennel | 364/426.02 |
| 4,791,569 | 12/1988 | Suzuki | 371/11.3 |
| 5,074,626 | 12/1991 | Kramer et al. | 364/426.02 |
| 5,142,474 | 8/1992 | Miyata et al. | 364/424.03 |
| 5,193,887 | 3/1993 | Bleckmann et al. | 364/426.03 |
| 5,265,944 | 11/1993 | Gloceri | 364/426.02 |
| 5,274,554 | 12/1993 | Takats et al. | 364/424.03 |

FOREIGN PATENT DOCUMENTS

| | | |
|---|---|---|
| 0322141 | 6/1989 | European Pat. Off. . |
| 0496509 | 7/1992 | European Pat. Off. . |
| 4107330 | 9/1991 | Germany . |
| 3217364 | 9/1991 | Japan . |

OTHER PUBLICATIONS

Automobiltechnische Zeitschrift, vol. 93, No. 7/8, Jul. 1991, Stuttgart, pp. 406–414, XP267526, Von Ulrich Stöcker et al.

Primary Examiner—Gary Chin

[57] ABSTRACT

A system for monitoring and controlling a running condition of a motor vehicle such as a motorcycle has a wheel speed sensor and first and second CPUs. The first and second CPUs effect in a first mode, i.e., when an anti-lock brake control mode is not effected, the same calculations to produce calculated data to monitor the running condition of the motor vehicle, and compare the calculated data from each other to check the effected calculations. In a second mode, i.e., when the anti-lock brake control mode is effected, the first CPU continues the calculations to produce calculated data to monitor the running condition of the motor vehicle, and the second CPU performs an auxiliary controlling function for controlling the running condition of the motor vehicle by controlling a brake mechanism in the anti-lock brake control mode.

5 Claims, 5 Drawing Sheets

SYSTEM FOR MONITORING AND CONTROLLING MOTOR VEHICLE RUNNING CONDITION

BACKGROUND OF THE INVENTION

1. Field of the Invention

The present invention relates to a motor vehicle running condition monitoring and controlling system having two central processing units (CPUs) whose output signals are usually compared with each other to confirm a running condition monitoring operation, and which are used as controlling and monitoring CPUs, respectively, for effecting and monitoring a certain vehicle controlling operation such as a brake controlling operation.

2. Description of the Related Art

Motor vehicle running condition monitoring systems for use with motor vehicles such as motorcycles, for example, determine an estimated vehicle speed, an estimated vehicle deceleration, wheel acceleration and deceleration, and a slip rate from a wheel speed detected by a vehicle speed sensor for monitoring a motor vehicle running condition. The motor vehicle running condition monitoring systems have two CPUs for carrying out the same operation, and the two CPUs produce output signals that are compared with each other to check their operation for errors.

The output signals from the two CPUs are always compared with each other only for the purpose of confirming the monitoring operation. Another controlling function, such as a brake controlling operation, that needs a shorter loop time than the loop time for monitoring a motor vehicle running condition is required to be carried out by another CPU than those for monitoring the motor vehicle running condition. Therefore, the number of CPUs installed on the motor vehicle is increased. Such a motor vehicle running condition monitoring system is disclosed in Japanese laid-open patent publication No. 3-217364, for example.

SUMMARY OF THE INVENTION

It is therefore an object of the present invention to provide a motor vehicle running condition monitoring system capable of both monitoring and controlling a motor vehicle running condition.

To achieve the above object, there is provided in accordance with the present invention a system for monitoring and controlling a running condition of a motor vehicle, comprising detecting means for detecting the running condition of the motor vehicle, first and second processing means for effecting, in a first mode, the same calculations to produce calculated data from the detected running condition to monitor the running condition of the motor vehicle, and comparing the calculated data from each other to check the effected calculations, and function distributing means for enabling the first processing means to continue, in a second mode, the calculations to produce calculated data from the detected running condition to monitor the running condition of the motor vehicle, and enabling the second processing means to perform an auxiliary controlling function to control the running condition of the motor vehicle in the second mode.

In the first mode, i.e., when an anti-lock brake control is not effected, the second processing means as well as the first processing means effects the same calculations to produce calculated data to monitor the running condition of the motor vehicle and to confirm them. In the second mode, the second processing means performs an auxiliary controlling function, such as the anti-lock brake control. Therefore, the system can achieve an auxiliary controlling operation relatively quickly and inexpensively without requiring an additional processor.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

The principles of the present invention will be described below as being incorporated in a motor vehicle running condition monitoring system for controlling an anti-lock brake controlling device on a motorcycle.

Figure 2:
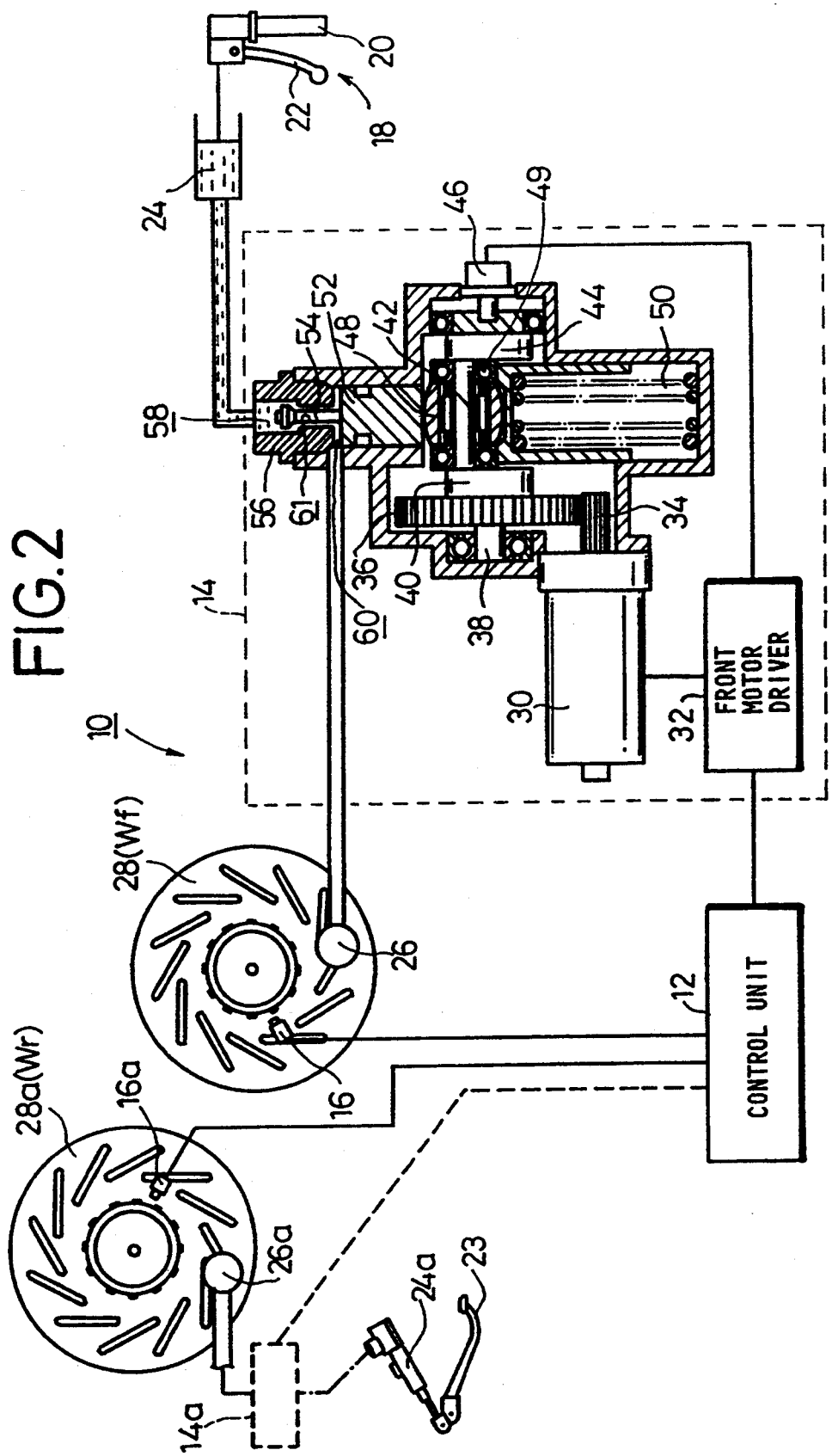
FIG. 2 is a schematic view of a brake controlling device that is controlled by the motor vehicle running condition monitoring system.

As shown in FIG. 2, a brake controlling device 10 has a control unit 12 for controlling a pressure modulator 14 to control a braking hydraulic pressure for applying an optimum braking force to a motorcycle wheel.

The control unit 12 is supplied with pulse signals representing wheel speeds Vw from a front wheel speed sensor 16 and a rear wheel speed sensor 16a that are positioned in the vicinity of a front wheel Wf and a rear wheel Wr, respectively, of the motorcycle. The control unit 12 has various calculating and deciding functions for performing desired calculations and decisions.

A brake mechanism 18 comprises a brake lever 22 mounted on a steering handle 20, a master cylinder 24 actuatable by the brake lever 22 for producing a hydraulic pressure, and a caliper cylinder 26 for braking the front wheel Wf based on the hydraulic pressure produced by the master cylinder 24. The master cylinder 24 and the caliper cylinder 26 are hydraulically connected to each other by the pressure modulator 14. The master cylinder 24 regulates the hydraulic pressure under the control of the brake lever 22, and transmits the regulated hydraulic pressure to a cut-off valve 54. The caliper cylinder 26 applies a braking force to a disk plate 28 coupled to the front wheel Wf based on the hydraulic pressure that is controlled by the cut-off valve 54.

The pressure modulator 14 for the front wheel Wf has a front motor driver 32 for energizing a front motor 30 in the form of a DC motor. The front motor driver 32 is electrically connected to the control unit 12 and supplied with an electric signal therefrom. The front motor 30 has a drive shaft to which there is connected a pinion 34 that is held in mesh with a gear 36. The gear 36 is fixedly mounted on a crankshaft 38 having one end connected through a crank arm 40 to one end of a crankpin 42. The other end of the crankpin 42 is connected to a crank arm 44 which is coupled to a potentiometer 46 for detecting the angular displacement of the crankpin 42.

A cam bearing 48 and a bearing 49 are rotatably mounted on the crankpin 42 coaxially with each other. The cam bearing 48 is normally urged to move upwardly by a return spring 50 that acts on the bearing 49. The cam bearing 48 has an upper surface held against a lower end of an expander piston 52 which can be vertically moved by the cam bearing 48. The cut-off valve 54 is connected to the expander piston 52 and can be opened and closed as the expander piston 52 is lifted and lowered. The cut-off valve 54 has an upper input port 58 held in communication with the master cylinder 24, and a valve casing 56 joined at its lower end to the expander piston 52. The cut-off valve 54 also has a lower output port 60 defined between the valve casing 56 and the expander piston 52 and held in communication with the caliper cylinder 26. The input port 58 and the output port 60 communicate with each other through a communication hole 61 defined around a valve body of the cut-off valve 54.

The rear wheel Wr is associated with a pressure modulator 14a hydraulically connected between a master cylinder 24a coupled to a brake pedal 23 and a caliper cylinder 26a connected to a disk plate 28a that is coupled to the rear wheel Wr. The pressure modulator 14a is structurally and functionally identical to the pressure modulator 14, and will not be described in detail below.

Figure 1:
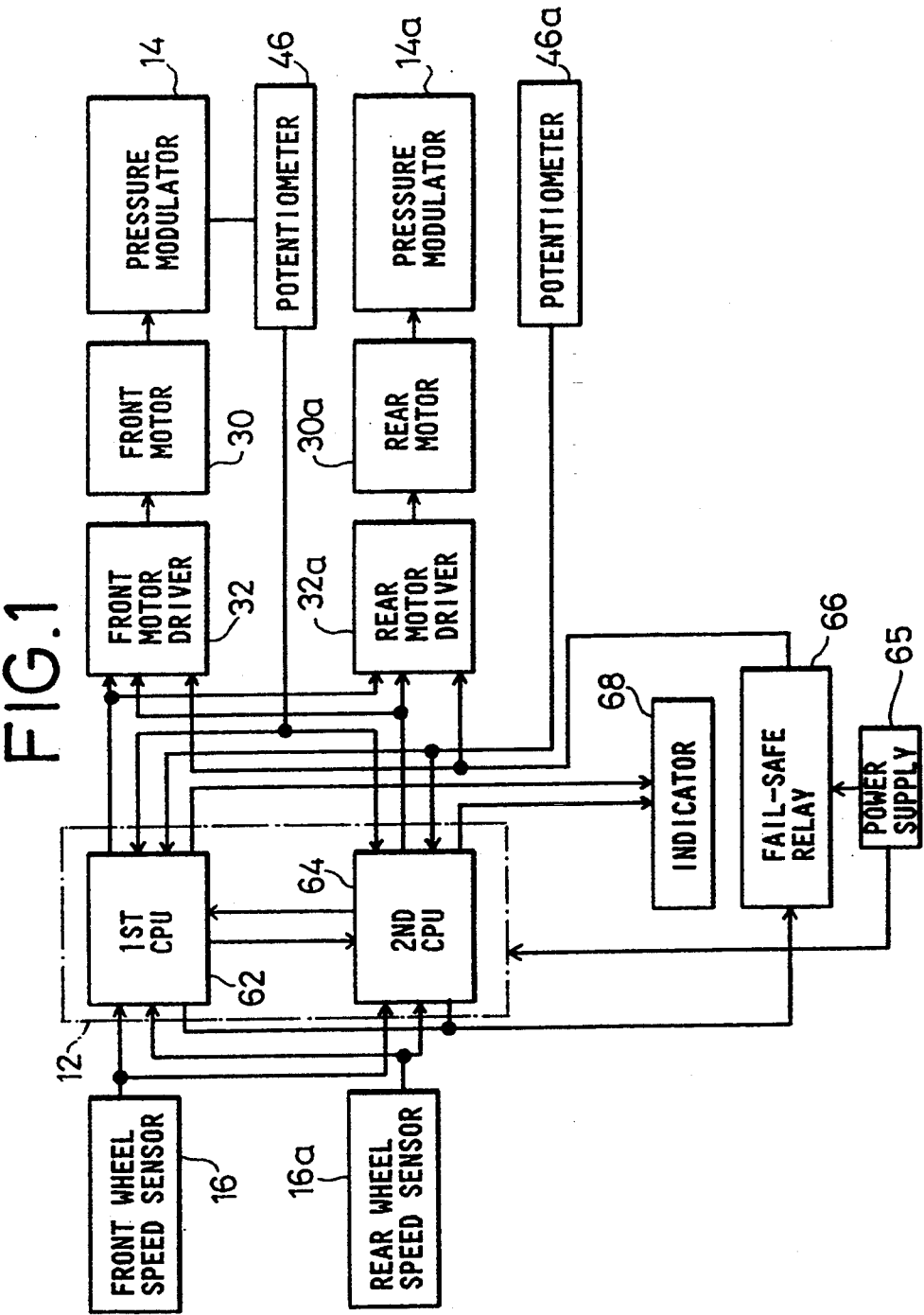
FIG. 1 is a block diagram of a motor vehicle running condition monitoring system according to the present invention.

As shown in FIG. 1, the control unit 12 comprises a first CPU 62 and a second CPU 64 each connected to a fail-safe relay 66 and an indicator 68. The fail-safe relay 66 cuts off electric energy supplied from a power supply 65 to the front motor drivers 32, 32a when the front wheel speed sensor 16, the rear wheel speed sensor 16a, the front motor driver 32, the rear motor driver 32a, the potentiometer 46, the potentiometer 46a, the CPU 62, or the CPU 64 suffers an operation error.

A control process carried out by the brake controlling device 10 will be described below with reference to FIGS. 3 and 4.

Figure 3:
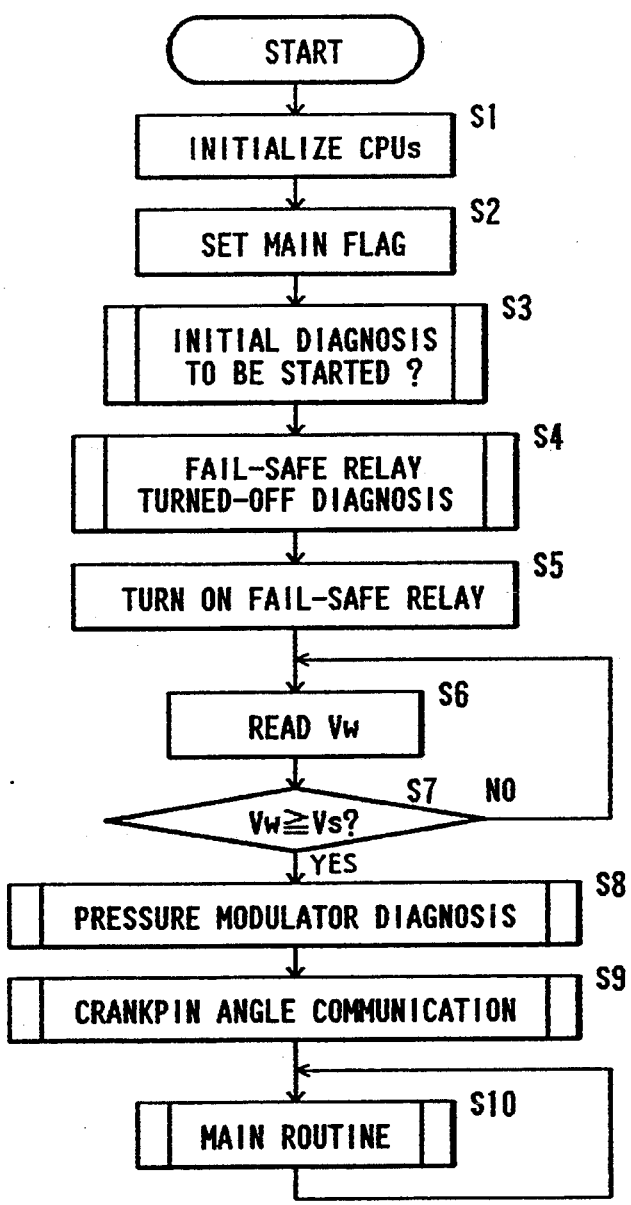
FIG. 3 is a flowchart of a control sequence of the motor vehicle running condition monitoring system.
Figure 4:
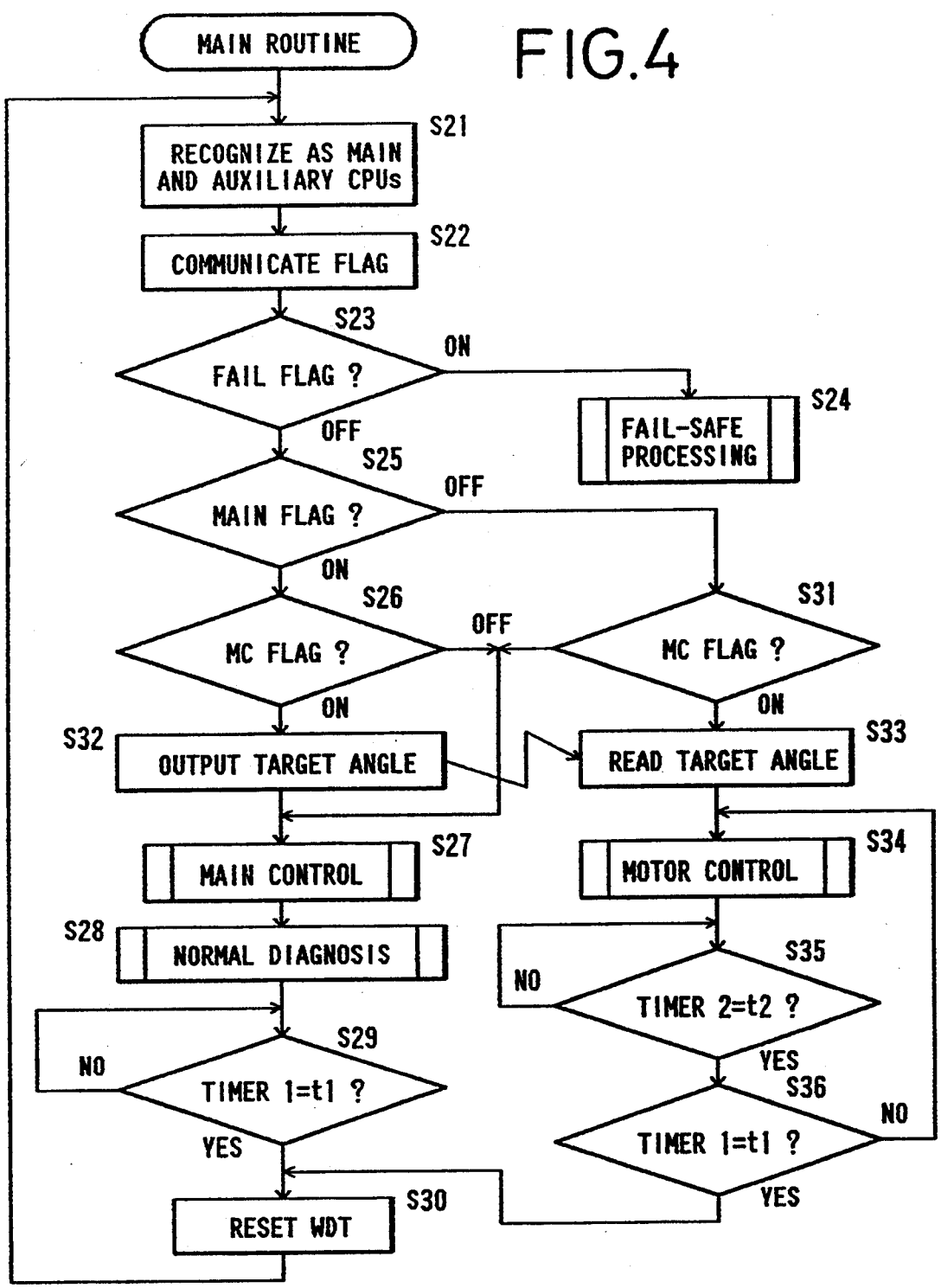
FIG. 4 is a flowchart of a main routine of the control sequence shown in FIG. 3.

As shown in FIG. 3, when the power supply 65 is turned on, the first CPU 62 and the second CPU 64 are initialized in a step S1. Then, a flag is set to cause one of the CPUs 62, 64 to be recognized as a main CPU and the other as an auxiliary CPU in a step S2. In this embodiment, the CPU 62 is recognized as a main CPU and the CPU 64 as an auxiliary CPU. Then, a step 3 determines whether an initial diagnostic process such as for checking a battery voltage is to be carried out. If the initial diagnostic process is carried out, a step S4 confirms that the fail-safe relay 66 is turned off. If normal, i.e., if the fail-safe relay 66 is turned off, then it is turned on in a step S5. Then, front and rear wheel speeds Vw are read from the front and rear wheel speed sensors 16, 16a into the first and second CPUs 16, 16a in a step S6. When each of the front and rear wheel speeds Vw becomes equal to or higher than a predetermined speed Vs in a step S7, a step S8 determines whether the front motor 30, the rear motor 30a, the potentiometer 46, the potentiometer 46a, the front motor driver 32, and the rear motor driver 32a operate normally or not. Crankpin angular displacements Θ are detected by the potentiometers 46, 46a and transmitted to the other potentiometers 46a, 46 in mutual communications for zero setting in a step S9. After the above initial diagnostic process, control goes to a main routine in a step S10.

The main routine in the step S10 will be described below with reference to FIG. 4. In the main routine, it is assumed that the CPU 62 operates as a main CPU and the CPU 64 as an auxiliary CPU.

In a step S21, the CPUs 62, 64 confirm that they are main and auxiliary CPUs, respectively, based on the flag set in the step S2. Subsequently, the CPU 62 operates as a main CPU and the CPU 64 as an auxiliary CPU. The, the CPUs 62, 64 communicate flags (described below) with each other in a step S22. If a fail flag is set in a step S23, then a fail-safe process is carried out in a step S24. For example, if the system is in an anti-lock brake control mode, then the fail-safe relay 66 turns off the electric energy supplied from the power supply 65 to the front and rear motor drivers 32, 32a, switching the brake control from the anti-lock brake control mode effected by the pressure modulators 14, 14a to the canceling of the anti-lock brake control mode.

If the fail flag is not set, then a step S25 determines whether a main flag is set or not. If the main flag is set, then the first CPU 62 determines in a step S26 whether a modulator control (MC) flag is set or not, i.e., the anti-lock brake control mode is to be effected by the pressure modulators 14, 14a or the anti-lock brake control mode is to be canceled.

If the anti-lock brake control mode is to be canceled, then the first CPU 62 as the main CPU calculates an estimated vehicle speed, an estimated vehicle deceleration, wheel acceleration and deceleration, and a slip rate from the wheel speeds Vw detected by the front and rear wheel speed sensors 16, 16a, and, if it determines based on the slip rate that the anti-lock brake control mode is to be effected, the first CPU 62 set the MC flag and carries out main calculations to calculate a target crankpin angular displacement (target angle ΘT) in a step S27. At this time, the second CPU 64 as the auxiliary CPU operates substantially in the same manner.

Thereafter, the first and second CPUs 62, 64 communicate data including the slip rate, the estimated vehicle speed, etc. with each other to determine whether the data are different from each other or not, i.e., some failure has occurred or not, in a step S28. The step S28 also determines whether the front motor 30 and the potentiometer 46 of the pressure modulator 14 have failed or not. If some failure is confirmed, then the fail flag is set in the step S28. After elapse of a predetermined loop time t1 set by a timer 1 in a step S29 (Timer 1=t1), a reset signal is applied to reset a watchdog timer in a step S30. Thereafter, control returns to the step S21.

If the main flag is not set in the step S25, then the second CPU 64 determines in a step S31 whether the MC flag is set or not, i.e., the anti-lock brake control mode is to be effected or canceled. If the anti-lock brake control mode is to be canceled, then the second CPU 64 executes the steps S27 through S30 in the same manner as the first CPU 62.

Therefore, insofar as the anti-lock brake control mode is canceled, the first and second CPUs 62, 64 operate in the same manner as each other, and communicate calculated data with each other in the step S28 to effect a diagnostic process at all times for checking the operation of the CPUs 62, 64 for errors.

If the anti-lock brake control mode is to be effected, i.e., if the MC flag is set in the steps S26, 31, then the CPUs 62, 64 operate as follows:

The first CPU 62 outputs the target angular displacement ΘT for the crankpin 42, which has been determined in the step S27 in the preceding cycle, to the second CPU 64 in a step S32. The second CPU 64 then executes the steps S27 through S30 as is the case when the anti-lock brake control mode is canceled.

The second CPU 64 reads the target angular displacement ΘT from the first CPU 62 in a step S33. Then, the second CPU 64 energizes the front motor 30 based on the target angular displacement ΘT and the angular displacement Θ read from the potentiometer 46 according to a proportional plus integral plus derivative (PID) control process in a step S34. More specifically, the front motor driver 32 energizes the front motor 30, which causes the pinion 34 and the gear 36 to rotate the crankshaft 38, thereby angularly displacing the crankpin 42 and the cam bearing 48. The return spring 50 is compressed against its own resiliency, lowering the expander piston 52 to enable the cut-off valve 54 to close the communication hole 61. The master cylinder 24 and the caliper cylinder 26 are now brought out of communication with each other. The front motor 30 is further energized to lower the expander piston 52 to increase the volume of the output port 60, thereby lowering the hydraulic pressure transmitted to the caliper cylinder 26 to obtain a suitable braking force. The pressure modulator 14a and the caliper cylinder 26a are controlled in the same manner as described above.

Figure 5:
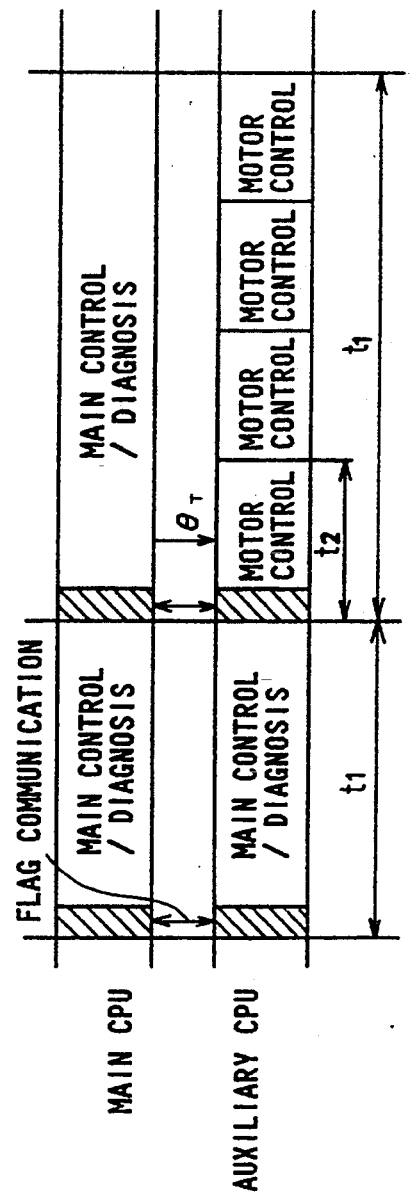
FIG. 5 is a diagram showing the manner in which the motor vehicle running condition monitoring system operates.

After elapse of a predetermined loop time t2 set by a timer 2 in a step S35 (Timer 2=t2), the steps 34, 35 are repeated until the loop time t1 set by the timer 1 elapses in a step S36 for thereby synchronizing the first and second CPUs 62, 64. In this embodiment, the loop time t1 is selected to be four times the loop time t2 (t1=4×t2). Therefore, the second CPU 62 repeats the motor control step S34 four times according to the PID control process while the first CPU 62 loops through the steps S27 through S29 (see FIG. 5) to effecting its own monitoring process.

Thereafter, a reset signal is outputted to the watch-dog timer in the step S30, causing the first and second CPUs 62, 64 to execute the parallel processing from the step S21.

As described above, when the anti-lock brake control mode is canceled, the first and second CPUs 62, 64 operate in the same manner as each other, and they communicate their calculated data with each other for checking their operation for errors. When the anti-lock brake control mode is to be effected in the step S31, the first and second CPUs 62, 64 operate differently from each other. That is, the first CPU 62 outputs the target angular displacement ΘT to the second CPU 64, which effects a PID control process to control the front motor 30 to produce an optimum braking forge based on the supplied target angular displacement ΘT and the crankpin angular displacement Θ that is read in each cycle. Since the loop time t2 of the second CPU 64 is shorter than the loop time t1 of the first CPU 62 (t1=4×t2), the second CPU 64 can control the motor 30 with high accuracy. Inasmuch as the first and second CPUs 62, 64 are assigned to the data calculation and the motor control, respectively, no other CPU is required to be added. The loop times of the first and second CPUs 62, 64 are monitored by the watchdog timer.

While the first CPU 62 is used as the main CPU and the second CPU 64 as the auxiliary CPU, the first CPU 62 may be used as the auxiliary CPU and the second CPU 64 as the main CPU.

Although a certain preferred embodiment of the present invention has been shown and described in detail, it should be understood that various changes and modifications may be made therein without departing from the scope of the appended claims.

What is claimed is:

1. A system for monitoring and controlling a running condition of a motor vehicle, comprising:
   detecting means for detecting the running condition of the motor vehicle;
   first and second processing means for effecting, in a first mode, the same calculations to produce calculated data from the detected running condition to monitor the running condition of the motor vehicle, and comparing the calculated data from each other to check the effected calculations; and
   function distributing means for enabling said first processing means to continue, in a second mode, the calculations to produce calculated data from the detected running condition to monitor the running condition of the motor vehicle, and enabling said second processing means to perform an auxiliary controlling function to control the running condition of the motor vehicle in the second mode.

2. A system according to claim 1, wherein said motor vehicle is a motorcycle.

3. A system according to claim 2, wherein, in said first mode, each of said first and second processing means calculates an estimated vehicle speed, an estimated vehicle deceleration, wheel acceleration and deceleration and a slip rate, based on rotational speeds of front and rear wheels of the motorcycle detected by said detecting means, and wherein, in said second mode, said second processing means calculates a target crankpin angular displacement, based on the slip rate, for an anti-lock brake controlling device.

4. A system according to claim 3, wherein said auxiliary controlling function is to control a front motor in the anti-lock brake controlling device to produce a suitable braking force through a proportional, integral and derivative (PID) control scheme based on said target crankpin angular displacement and a detected crankpin angular displacement.

5. A system according to claim 1, wherein in said second mode, one of said first and second processing means has a loop time which is a multiple of the loop time of the other of said first and second processing means, and in said first mode, said first and second processing means have the same loop time.

* * * * *